(12) United States Patent
Katsuyoshi

(10) Patent No.: US 6,341,907 B1
(45) Date of Patent: Jan. 29, 2002

(54) PRINTING DEVICE AND HOST DEVICE

(75) Inventor: Kondo Katsuyoshi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 09/587,839

(22) Filed: Jun. 6, 2000

(30) Foreign Application Priority Data

Jun. 16, 1999 (JP) .................................... 11-169676

(51) Int. Cl.[7] .......................... B41J 11/42; G03G 15/00; H04N 1/21; H04N 1/32; G06F 15/173
(52) U.S. Cl. .......................... 400/582; 400/83; 358/1.15; 358/1.16; 358/442; 358/402; 399/82; 399/87; 709/314
(58) Field of Search ........................ 400/70, 83, 582; 358/1.6, 1.14, 1.15, 1.16, 1.17, 403, 442, 468; 101/113; 399/82, 87; 709/314

(56) References Cited

U.S. PATENT DOCUMENTS

| | | | | |
|---|---|---|---|---|
| 4,829,468 A | * | 5/1989 | Wonaka et al. | 359/1.17 |
| 4,947,345 A | * | 8/1990 | Paradise et al. | 358/442 |
| 5,018,079 A | * | 5/1991 | Shukunami et al. | 358/1.6 |
| 5,124,809 A | * | 6/1992 | Koishikawa | 358/442 |
| 5,200,830 A | * | 4/1993 | Imaizumi | 358/442 |
| 5,228,118 A | * | 7/1993 | Sasaki | 358/1.15 |
| 5,278,984 A | * | 1/1994 | Batchelor | 709/314 |
| 5,377,016 A | * | 12/1994 | Kashiwagi et al. | 358/403 |
| 5,418,904 A | * | 5/1995 | Tomiyasu et al. | 358/401 |
| 5,541,582 A | * | 7/1996 | Wagner et al. | 358/1.15 |
| 5,603,578 A | * | 2/1997 | Furuya | 400/582 |
| 5,754,744 A | * | 5/1998 | Matsumoto et al. | 358/1.14 |
| 5,774,356 A | * | 6/1998 | Hisatake et al. | 101/113 |
| 5,815,280 A | * | 9/1998 | Ohmura et al. | 358/468 |
| 5,816,716 A | * | 10/1998 | Sugiyama | 400/582 |
| 5,872,901 A | * | 2/1999 | Kunno et al. | 358/442 |
| 5,883,724 A | * | 3/1999 | Yamada | 358/442 |
| 5,920,405 A | * | 7/1999 | McIntyre et al. | 358/442 |
| 6,137,587 A | * | 10/2000 | Muto et al. | 358/1.15 |
| 6,219,502 B1 | * | 4/2001 | Osart et al. | 399/82 |
| 6,236,464 B1 | * | 5/2001 | Kohtani et al. | 358/1.15 |
| 6,252,681 B1 | * | 6/2001 | Gusmano et al. | 358/468 |
| RE37,258 E | * | 7/2001 | Patel et al. | 358/1.15 |

FOREIGN PATENT DOCUMENTS

| | | |
|---|---|---|
| JP | 5-189174 | 7/1993 |
| JP | 5-250112 | 9/1993 |
| JP | 7-129336 | 5/1995 |

* cited by examiner

*Primary Examiner*—Eugene Eickholt
(74) *Attorney, Agent, or Firm*—Dike, Bronstein, et al.; David G. Conlin (57) ABSTRACT

A printing system including printing device and at least two host devices. Each of the at least two host devices inputs a priority of a print request, and transmits a reason for the priority of the print request together with the print request and the priority, when the priority is higher than a predetermined priority. The printing device performs printing operations requested by a plurality of print requests, in an order in which the plurality of print requests are arranged, and changes ordinal positions of the plurality of print requests in the order according to priorities of the plurality of print requests so that an ordinal position of a print request with a higher priority precedes an ordinal position of a print request with a lower priority. When the printing device receives from a first host device a print request with a priority higher than a predetermined priority, the printing device sends information on the first host device to at least one second host device other than the first host device.

11 Claims, 6 Drawing Sheets

PRINTING DEVICE AND HOST DEVICE

BACKGROUND OF THE INVENTION

1. Field of the Invention

The present invention relates to a printing device which can be commonly used by a plurality of users through a plurality of host devices. The present invention also relates to a host device which is connected to the printing device so that a user can use the printing device through the host device. In particular, the present invention relates to a printing device which performs print jobs in the order determined by priorities of print requests, and a host device connected with such a printing device.

2. Description of the Related Art

For example, Japanese Unexamined Patent Publications, No. 5-189174 (titled "Control System of a Plurality of Print Queues") and No. 7-129336 (titled "Printing Device and System Thereof") propose techniques in which a plurality of print requests are received, and at least one print queue is manipulated so that execution of urgent or higher priority print requests take precedence over execution of lower priority print requests. That is, according to the above techniques, when a print job is required to be urgently performed, the print job is immediately performed. In this case, no explanation is made to users on the reason for the precedence of the urgent print job, or no negotiation is conducted with other users for withdrawal of other print requests which have been made previously by other users.

On the other hand, Japanese Unexamined Patent Publications, No. 5-250112 (titled "Print Output Control System") proposes a technique in which completion times of print outputs in response to a plurality of print requests are informed to users when contents of a print queue are changed, while the completion times of print outputs are normally informed to the users only when the plurality of print requests are received.

However, in the printing systems where users can freely manipulate the priority, bad-mannered users may abuse the function of raising the priority for their usual print jobs in addition to the urgent print job. If the function of raising the priority is abused by the bad-mannered users, well-mannered users may suffer a loss. In particular, such an abuse may impede execution of really urgent print jobs.

SUMMARY OF THE INVENTION

An object of the present invention is to provide a printing device in which abuse of the function of raising the priority of a print job is prevented, and all of the users can use urgent print service fairly and smoothly.

Another object of the present invention is to provide a host device which enables all of the users to fairly and smoothly use urgent print service of a printing device.

According to the first aspect of the present invention, there is provided a printing device for performing printing operations requested by a plurality of print requests, in an order in which the plurality of print requests are arranged. The printing device comprises a print control unit which changes ordinal positions of said plurality of print requests in said order according to priorities of said plurality of print requests so that an ordinal position of a print request with a higher priority precedes an ordinal position of a print request with a lower priority; and an information unit which sends information on a first user or first host device to at least one of second users or second host devices other than said first user or first host device when said printing device receives from said first user or first host device a print request with a priority higher than a predetermined priority.

In the printing device according to the first aspect of the present invention, a user or host device who makes a print request with a high priority can be known by the other users. Therefore, it is possible to obtain the consent of the other users to the print request having the priority, and prevent users from easily manipulating the priority or abusing the priority manipulation.

The printing device according to the first aspect of the present invention may have one or any possible combination of the following additional features (i) to (viii).

(i) The information unit may send the information to all users registered in the printing device or all host devices connected to the printing device. In this case, the effect of preventing the abuse of the function of raising a priority is enhanced.

(ii) The information unit may send the information to at least one of third users or third host devices which made a print request the ordinal position of which was changed to a lower place by the print control unit. In this case, it is easy to call attention of the users who may have to cope with the change of the ordinal positions in the order.

(iii) The printing device according to the first aspect of the present invention may further comprise a request recording unit which records as a log print requests with priorities higher than a predetermined priority. In this case, users can confirm the times of the occurrences of priority processing, and the number of occurrences of priority processing within a predetermined period of time for each user. Therefore, abuse of the priority processing can be prevented (iv) The information unit may send the information by electronic mail. In this case, the information can be sent to users by using the existing system, and therefore, it is not necessary to provide a further means for sending the information to the users.

(v) The information sent by the information unit may include a reason for the priority of the print request. In this case, users of requests the ordinal positions of which are preceded by the (newly received) request in the above order can confirm necessity or urgency of the (newly received) request, and the consent of the other users to the priority of the (newly received) request can be obtained more easily.

(vi) The printing device according to the first aspect of the present invention may further comprise a reason recording unit which records as a log reasons for the priorities of the print requests. In this case, the same effects as above feature (v) can be obtained.

(vii) The printing device according to the first aspect of the present invention may further comprise a prohibition unit which prohibits the printing operation of the printing unit for a print request which is not accompanied by information on a reason for the priority of the print request. In this case, it is possible to prevent users from easily raising a priority.

(viii) The printing device according to the first aspect of the present invention may further comprise a model storing unit which stores reasons for the priorities of the print requests as models for the reasons. In this case, users can share the reasons for priorities of print request. That is, users who wishes to make a new request can refer to priorities of print requests which have been set for the same reason by other users, and set a priority for the new request so as to be balanced with the priorities set by the other users. Therefore, it is more probable that users who have made requests the ordinal positions of which are preceded by the new request accept the priority of the new request.

According to the second aspect of the present invention, there is provided a host device including a priority input unit which inputs a priority of a print request; a transmitting unit which transmits the print request and the priority; and a transmission control unit which controls the transmitting unit so as to transmit a reason for the priority of the print request together with the print request and the priority, when the priority is higher than a predetermined priority.

The host device according to the second aspect of the present invention may have one possible combination of the following additional feature (ix).

(ix) The host device according to the second aspect of the present invention may further comprise a model storing unit which stores reasons for the priorities of the print requests as models for said reasons. In this case, a criterion for determining whether or not the priority is allowed to be raised becomes clearer. In addition, users can refer to and revise the above reason for the priority as needed, and easily produce a reason for a priority according to the circumstances.

DESCRIPTION OF THE PREFERRED EMBODIMENTS

The various embodiments of the present invention are explained below with reference to drawings.

Generally, the "priority" may be represented by a numerical value which indicates a rank or a level of priority, and may be understood to increase with rise in the "priority". Alternatively, the "priority" may be represented by an integer which indicates order of priority, and is understood to decrease with rise in the "priority". In the following descriptions, the "priority" may be represented in any way as long as the "priority" or the "priority level" enables determination of a higher priority print job (request) when priorities of print jobs (requests) are compared.

Figure 1:
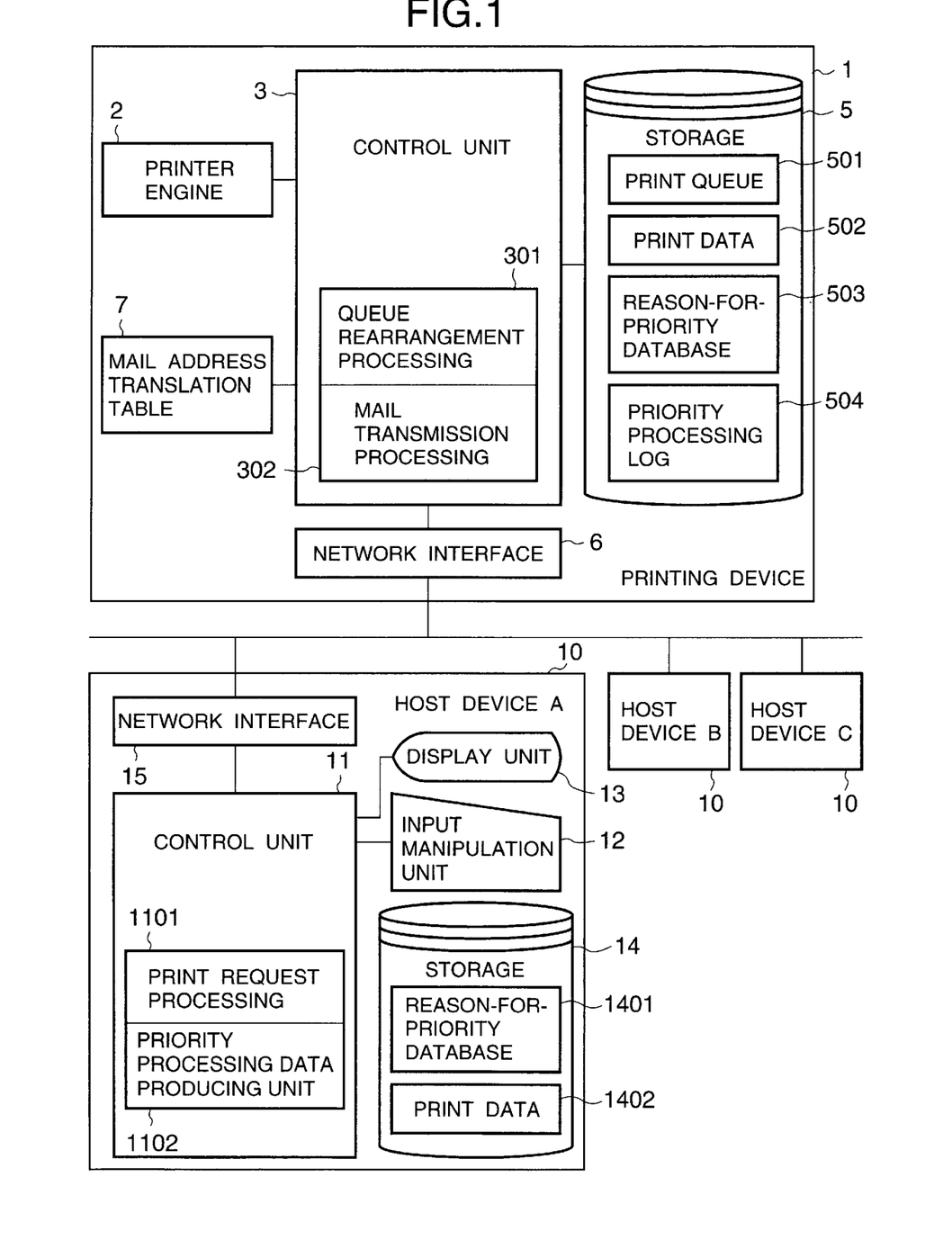
FIG. 1 is a block diagram illustrating the constructions of a host device and the printing device as an embodiment of the present invention.

FIG. 1 is a block diagram illustrating a construction of a printing system including a plurality of host devices and a printing device, as an embodiment of the present invention. In the construction of FIG. 1, the printing device 1 is shared by the plurality of host devices 10 through a network.

The printing device 1 comprises a printer engine 2, a control unit 3, a storage 5, a mail address translation table 7, and a network interface unit 6. The printer engine 2 performs a printing operation. The control unit 3 performs overall control of the printing device 1, and is realized by a microcomputer or the like. The storage 5 stores various data. The mail address translation table 7 is constituted by an EEPROM.

The host device 10 comprises a control unit 11, an input manipulation unit 12, a display unit 13, a storage 14, and a network interface unit 15. The control unit 11 is realized by a microcomputer or the like. The input manipulation unit 12 is realized by, for example, a keyboard and a mouse. The display unit 13 is realized by a CRT or the like. The storage 14 is realized by a hard disk drive or the like.

The control unit 3 in the printing device 1 responds to a print request from each host device 10. When the printing device 1 receives a print request while no print job is handled by the printer engine 2, the control unit 3 transfers print data to the printer engine 2, where the print data is supplied to the control unit 3 through the network interface unit 6. Thus, the printer engine 2 performs a print job to produce a print output.

When the control unit 3 newly receives a request for a first print job while the printer engine 2 is handling a second print job, and the priority of the request for the first print job is higher than the priority of the request for the second print job currently handled by the printer engine 2, the control unit 3 interrupts the second print job currently handled by the printer engine 2, and temporarily saves print data of the second print job in the print data area 502 in the storage 5. Then, print data of the first print job is supplied to the printer engine 2 so that the printer engine 2 handles the first print job as an interrupt. In addition, at this time, the mail transmission processing unit 302 in the control unit 3 refers to the print queue 501 stored in the storage 5, to obtain an ID code of a user who has requested the second print job which is interrupted, and refers to the mail address translation table 7 to obtain an electronic mail address of the user based on the ID code. Then, the mail transmission processing unit 302 sends by electronic mail to the user who has requested the second print job, information that the print job requested by the user has been interrupted. When the handling of the interrupt is completed, the control unit 3 continues the unfinished (interrupted) print job, for which the print data is saved in the print data area 502 in the storage 5, and records the completion of the priority processing in the priority processing log 504 provided in the storage 5.

When the control unit 3 newly receives a request for a third print job while the printer engine 2 is handling the second print job, and the priority of the request for the third print job is lower than the priority of the request for the second print job currently handled by the printer engine 2, the control unit 3 does not interrupt the second print job currently handled by the printer engine 2, performs queue rearrangement processing 301 to renew the print queue 501, and stores the renewed print queue 501 in the storage 5. In addition, the control unit 3 refers to the mail address translation table 7, informs at least one user which is determined in a predetermined manner, of the change of the print queue, and records the change of the print queue in the priority processing log 504 in the storage 5.

The above at least one user may be all of the users of the printing device 1 including users of requests having priorities higher than the priority of the newly received request for the third print job, or only the users of requests having priorities lower than the priority of the newly received request, i.e., the users of requests which are preceded by the newly received request in the rearranged print queue. When the change of the print queue is informed to all of the users of the printing device 1, the use of the function of priority printing can be monitored by all of the users of the printing device (for example, by all members of a business section), so that it is possible to prevent abuse of the function of priority printing. On the other hand, when the change of the print queue is informed to only the users of the requests having priorities lower than the priority of the newly received request, the change is informed to only the users of the requests which are affected by the change. That is, it is possible to call attention of only the users who may have to cope with the change in the print queue.

Since the notification to the users is made by electronic mail, and the address of the electronic mail is obtained based on the ID code of the user by using the mail address translation table 7, no particular means is required to be provided for the notification, and the automatic notification can be readily realized by utilizing existing service functions. Therefore, the above notification by electronic mail is preferable in the case where the users of the printing device 1 are fixed, e.g., the case where all of the users are members of a business section. Further, it is possible to use the electronic mail addresses as the ID codes. In this case, the mail address translation table 7 can be dispensed with, and therefore the construction of the printing device 1 can be further simplified. Thus, the use of the electronic mail addresses as the ID codes is particularly preferable in the case where the users of the printing device 1 are not fixed, e.g., the case where at least a portion of the users are not a member of a business section.

Figure 2:
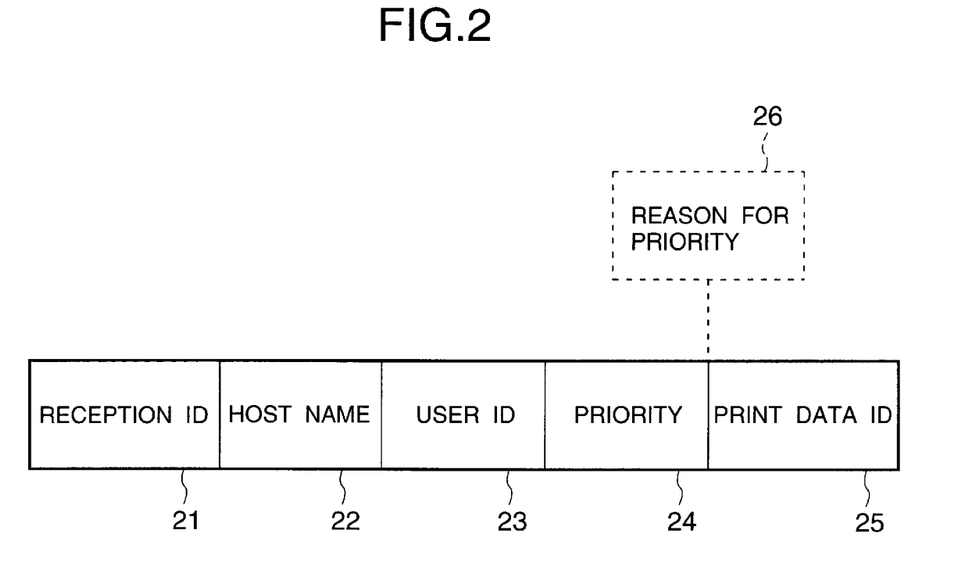
FIG. 2 is a diagram illustrating contents of an example of print request data.

In each host device 10, the control unit 11 sends print data 1402 stored in the storage 14 to the printing device 1 through the network interface unit 15 so that a print job is performed in the printing device 1 for the print data. In this case, the host device 10 produces print request data, and sends the print request data to the printing device 1. For example, the print request data includes data of a host name 22, a user ID 23, a priority 24, and the above print data, as illustrated in FIG. 2. When the printing device 1 receives the print request data, the printing device 1 attaches data of reception ID 21 to the received print request data to form the data structure of FIG. 2. Then, the printing device 1 stores the print request data in the print queue 501 in the storage 5.

The print request data can be produced in the host device 10 when the print data is designated, and the priority is input, by manipulation of the input manipulation unit 12. In addition, it is possible to further include data of a reason for the priority 26 in the print request data. In the example of FIG. 2, the data of the reason for the priority 26 can be inserted into the print request data, in the position following the data of the priority 24. By including the data of the reason for the priority 26 in the print request data, the reason for the priority can be informed to users other than the user of the host device 10 which produced the data of the reason for the priority 26, so that the users of requests which are preceded by the newly received request in the print queue can confirm necessity or urgency of a newly received request, and the consent of the other users to the priority of the newly received request can be obtained more easily.

Further, the control unit 3 in the printing device 1 may be configured to prohibit the priority processing when the above reason for the priority 26 is not included in the print request data. This provision will be effective in preventing the users from easily raising the priority.

Figure 3:
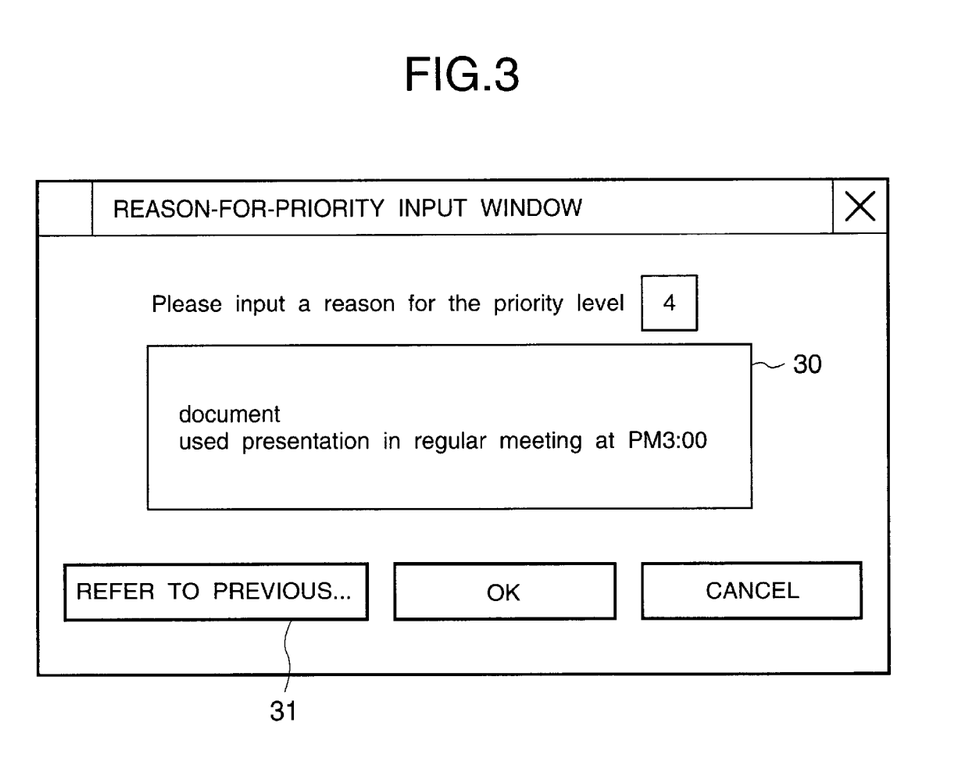
FIG. 3 is a diagram illustrating the first example of a reason-for-priority input window.
Figure 4:
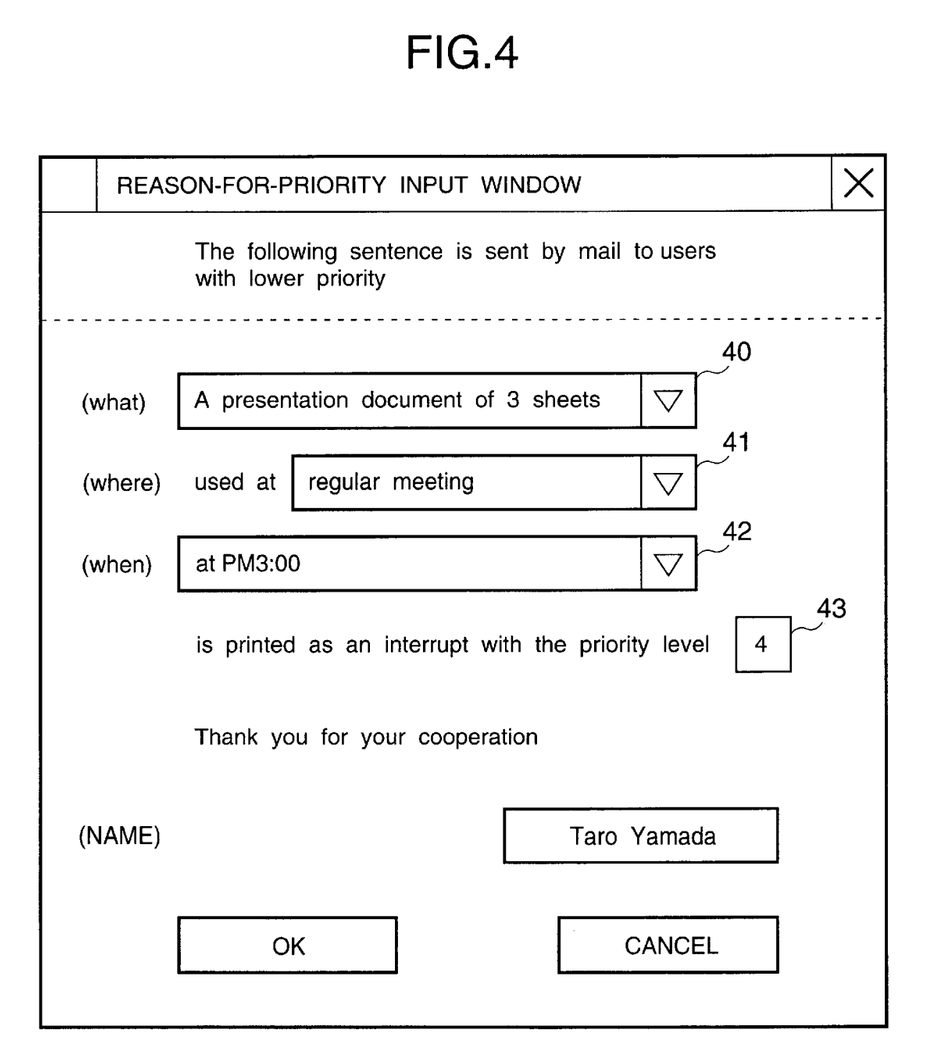
FIG. 4 is a diagram illustrating the second example of the reason-for-priority input window.

The above print request data may be produced by revising a model sentence which is stored in advance, for example, in the reason-for-priority database 1401 in the storage 14. For example, when a user wishes to input a reason for a priority, the display unit 13 displays a reason-for-priority input window as illustrated in FIG. 3. In this case, the user can inputs the reason for the priority by revising the model sentence 30. Alternatively, the display unit 13 may display another reason-for-priority input window as illustrated in FIG. 4, which is designed for assisting users to input information by providing separate option boxes and text boxes for the information items: contents 40, place 41, time 42, priority 43, and user's name. When the reason-for-priority input window of FIG. 4 is used, the users can easily produce the reason for the priority so as to indicate a situation which can be understood by other users. Thus, when the model sentence is stored in advance in the reason-for-priority database 1401 in the storage 14, a criterion for determining whether or not the priority is allowed to be raised becomes clearer, and therefore the priority can be appropriately set.

In addition, the reason-for-priority database 1401 in the storage 14 stores reasons for priorities which have been produced previously, and users can refer to the reasons for priorities which have been produced previously, as needed, by clicking on the "Refer to previous . . . " button 31 in the reason-for-priority input window of FIG. 3. Since users can retrieve and utilize an arbitrary one of the reasons for priorities which have been produced previously, this provision saves the users from having to input the whole sentence which indicates the reason for priority.

On the other hand, the printing device 1 also comprises a reason-for-priority database 503 in the storage 5, and is configured to appropriately store the data of the reason for the priority 26 in the reason-for-priority database 503, where the data of the reason for the priority 26 is included in the aforementioned print request data sent from the host device 10. The plurality of host devices 10 share data of reasons for priorities stored in the reason-for-priority database 503, and can refer to and revise the data of reasons for priorities as needed. Therefore, each user who wishes to set a priority of a new request can refer to priorities which have been previously set by others for the same reasons as the reason which the user has, and set a priority balanced with the priorities set by the other users so that the consent of users of requests which are preceded by the new request can be easily obtained.

In this embodiment, a plurality of occurrences of priority processing within a predetermined period of time or a predetermined number of occurrences of priority processing are recorded in the priority processing log 504 in the storage 5, where the occurrences of priority processing include the aforementioned completion of the priority processing or change in the print queue. Therefore, users can confirm the times of the occurrences of priority processing. In addition, since it is possible to confirm the number of occurrences of priority processing within a predetermined period of time for each user, the provision of the priority processing log 504 also has an effect of preventing abuse of the priority processing.

Figure 5:
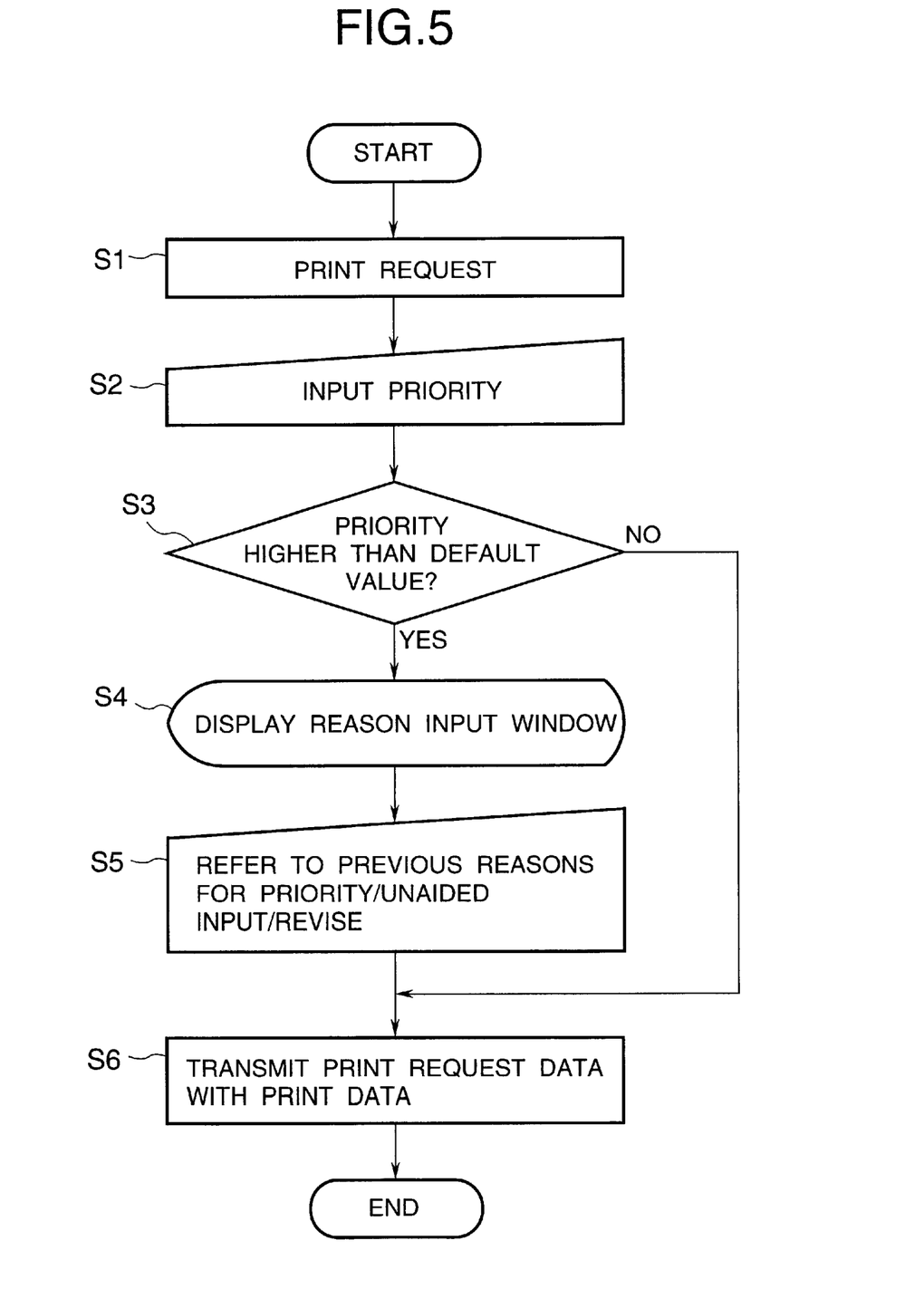
FIG. 5 is a flowchart of an operation of transmitting print request data from the host device.

FIG. 5 is a flowchart of an operation of transmitting print request data from the host device 10. In step S1, processing of generating a print request is started, and the host device waits for an input of a priority in step S2. When the priority is input, in step S3, it is determined whether or not the input priority is higher than a normally used value (default value). When yes is determined in step S3, the operation goes to step S6 to transmit print request data and print data, and the operation of FIG. 5 is completed. When no is determined in step S3, the operation goes to step S4, and the display unit 13 displays a reason-for-priority input window as illustrated in FIG. 3 or 4. In step S5, a reason for the priority is input, for example, by a user referring to the aforementioned reasons for priorities which have been produced previously. Then, the operation goes to step S6 to transmit print request data and print data, and the operation of FIG. 5 is completed.

Figure 6:
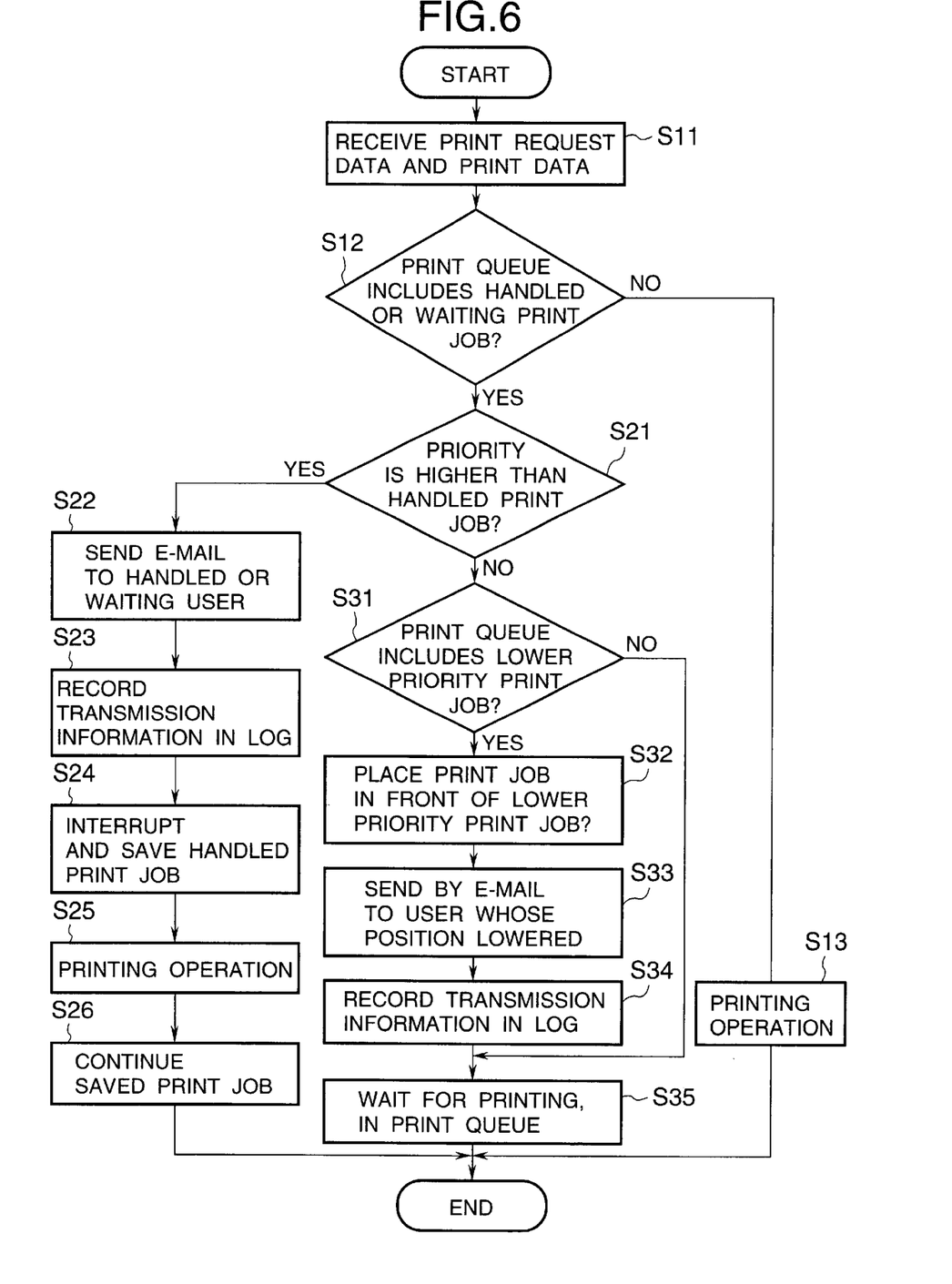
FIG. 6 is a flowchart of an operation of receiving the print request data by the printing device.

FIG. 6 is a flowchart of an operation of receiving the print request data by the printing device 1. When the printing device 1 receives the print request data and the print data in step S11, the operation goes to step S12, and it is determined whether or not the print queue 501 includes a print job which is currently handled or print request data which is waiting for printing. When no is determined in step S12, in step S13, a print job of the print request data received in step S11 is immediately performed, and the operation of FIG. 6 is completed. When yes is determined in step S12, the operation goes to step S21. In step S21, it is determined whether or not the priority of the print request data received in step S11 is higher than the priority of the currently handled print job. When yes is determined in step S21, the operation goes to step S22, and information that an interrupt operation is performed is sent by electronic mail to users of the print job which is currently handled or the print request data which is waiting for printing. Then, in step S23, information on the transmission is recorded in the priority processing log 504. In step S24, the currently handled print job is interrupted, and data of the interrupted print job is saved. In step S25, a printing operation of the print request data received in step S11 is performed. When the printing operation of step S25 is completed, in step S26, the interrupted print job is continued based on the saved data. When the print job is completed in step S26, the operation of FIG. 6 is completed.

When no is determined in step S21, i.e., when the print request data received in step S11 is not higher than the priority of the currently handled print job, the operation goes to step S31, and it is determined whether or not the print queue 501 includes print request data with a priority lower than the priority of the print request data received in step S11. When no is determined in step 31, the priority of the print request data received in step S11 is the lowest in the print queue 501. Therefore, the operation goes to step S35, and the print request data received in step S1 is placed at the end of the print queue 501 to wait for printing, and the operation of FIG. 6 is completed. On the other hand, when yes is determined in step S31, i.e., when the print queue 501 includes print request data with a priority lower than the priority of the print request data received in step S11, the operation goes to step S32, and rearrangement of the contents of the print queue 501 is performed so as to place the print request data received in step S11 into front of the print request data with the priorities lower than the priority of the print request data received in step S11, in the print queue 501. Then, in step S33, information on the rearrangement of the contents of the print queue 501 is sent by electronic mail to the users of the print request data which are preceded by the print request data received in step S11 in the print queue 501. Next, in step S34, information on the transmission is recorded in the priority processing log 504, and the operation goes to step S35 to wait for printing.

The scope of the present invention is not limited to the above embodiment.

For example, the notification to users may not be made by electronic mail. The notification to users may be made by any means such as message transmission by using a pager, facsimile, and telephone messaging using synthetic voice. Further, the means for sending the notification to users may be different according to the individual users.

In addition, the destination of the notification may be a user, or one of the host devices (e.g., application software for printing).

The printing device may be configured to record priority processing in the log when at least one request in the print queue is preceded by a newly received request by the priority processing. Alternatively, the printing device may be configured to record all the occurrences of the priority processing for the requests of priorities higher than the default value.

All of the contents of the Japanese patent application, No. 11-169676 are incorporated into this specification by reference.

What is claimed is:

1. A printing device for performing printing operations requested by a plurality of print requests, in an order in which the plurality of print requests are arranged, said printing device comprising:

a print control unit which changes ordinal positions of said plurality of print requests in said order according to priorities of said plurality of print requests so that an ordinal position of a print request with a higher priority precedes an ordinal position of a print request with a lower priority; and an information unit which sends information on a first user or first host device to at least one of second users or second host devices other than said first user or first host device when said printing device receives from said first user or first host device a print request with a priority higher than a predetermined priority.

2. A printing device according to claim 1, wherein said information unit sends said information to all users registered in said printing device or all host devices connected to said printing device.

3. A printing device according to claim 1, wherein said information unit sends said information to at least one of third users or third host devices which made a print request the ordinal position of which was changed to a lower place by said print control unit.

4. A printing device according to claim 1, further comprising a request recording unit which records as a log print requests with priorities higher than a predetermined priority.

5. A printing device according to claim 1, wherein said information unit sends said information by electronic mail.

6. A printing device according to claim 1, wherein said information includes a reason for the priority of the print request.

7. A printing device according to claim 1, further comprising a reason recording unit which records as a log reasons for the priorities of the print requests.

8. A printing device according to claim 1, further comprising a prohibition unit which prohibits the printing operation of said printing unit for a print request which is not accompanied by information on a reason for the priority of the print request.

9. A printing device according to claim 1, further comprising a model storing unit which stores reasons for the priorities of the print requests as models for said reasons.

10. A host device comprising:

a priority input unit which inputs a priority of a print request;

a transmitting unit which transmits said print request and said priority; and a transmission control unit which controls said transmitting unit so as to transmit a reason for the priority of the print request together with the print request and the priority, when the priority is higher than a predetermined priority.

11. A host device according to claim 10, further comprising a model storing unit which stores reasons for the priorities of the print requests as models for said reasons.

* * * * *